United States Patent [19]

Stewart

[11] Patent Number: 5,007,274
[45] Date of Patent: Apr. 16, 1991

[54] BILLET PRE-PIERCER APPARATUS AND METHOD

[76] Inventor: Charles L. Stewart, 1733 Addison Rd., Palos Verdes Estates, Calif. 90274

[21] Appl. No.: 409,800

[22] Filed: Sep. 20, 1989

[51] Int. Cl.⁵ ............................................. B21C 23/08
[52] U.S. Cl. ........................................ 72/254; 72/273
[58] Field of Search ................ 72/254, 256, 263, 264, 72/265, 267, 273, 334, 358

[56] References Cited

U.S. PATENT DOCUMENTS

| | | | |
|---|---|---|---|
| 2,491,897 | 12/1949 | Lorant | 72/265 |
| 3,388,579 | 6/1968 | Hilton | 72/358 |
| 3,525,245 | 8/1970 | Sallis | 72/267 |
| 4,165,625 | 8/1979 | Wagner et al. | 72/254 |
| 4,416,139 | 11/1983 | Hesse et al. | 72/273 |

FOREIGN PATENT DOCUMENTS 1368058  1/1988  U.S.S.R. ............................ 72/264

Primary Examiner—Lowell A. Larson
Attorney, Agent, or Firm—Spencer & Frank

[57] ABSTRACT

An apparatus for pre-piercing billets includes a generally cylindrical container for receiving and supporting a generally cylindrical billet, a mandrel bar mounted for axial movement along the axis of the cylinder for penetrating the billet, and a bolster for engaging the billet during penetration of the billet by the mandrel bar, wherein the bolster includes a bolster pin which is axially movable along the axis of the container, the bolster pin having an end which contacts the billet during penetration of the billet by the mandrel bar such that the billet deforms about the end of the bolster pin. A movable support is carried by the mandrel bar toward the billet during advancement of the mandrel bar prior to pre-piercing the billet, the movable support being configured to enter the generally cylindrical container to engage a portion of the container so as to provide additional structural rigidity to the mandrel bar to resist deflection of the mandrel bar during penetration of the billet.

22 Claims, 6 Drawing Sheets

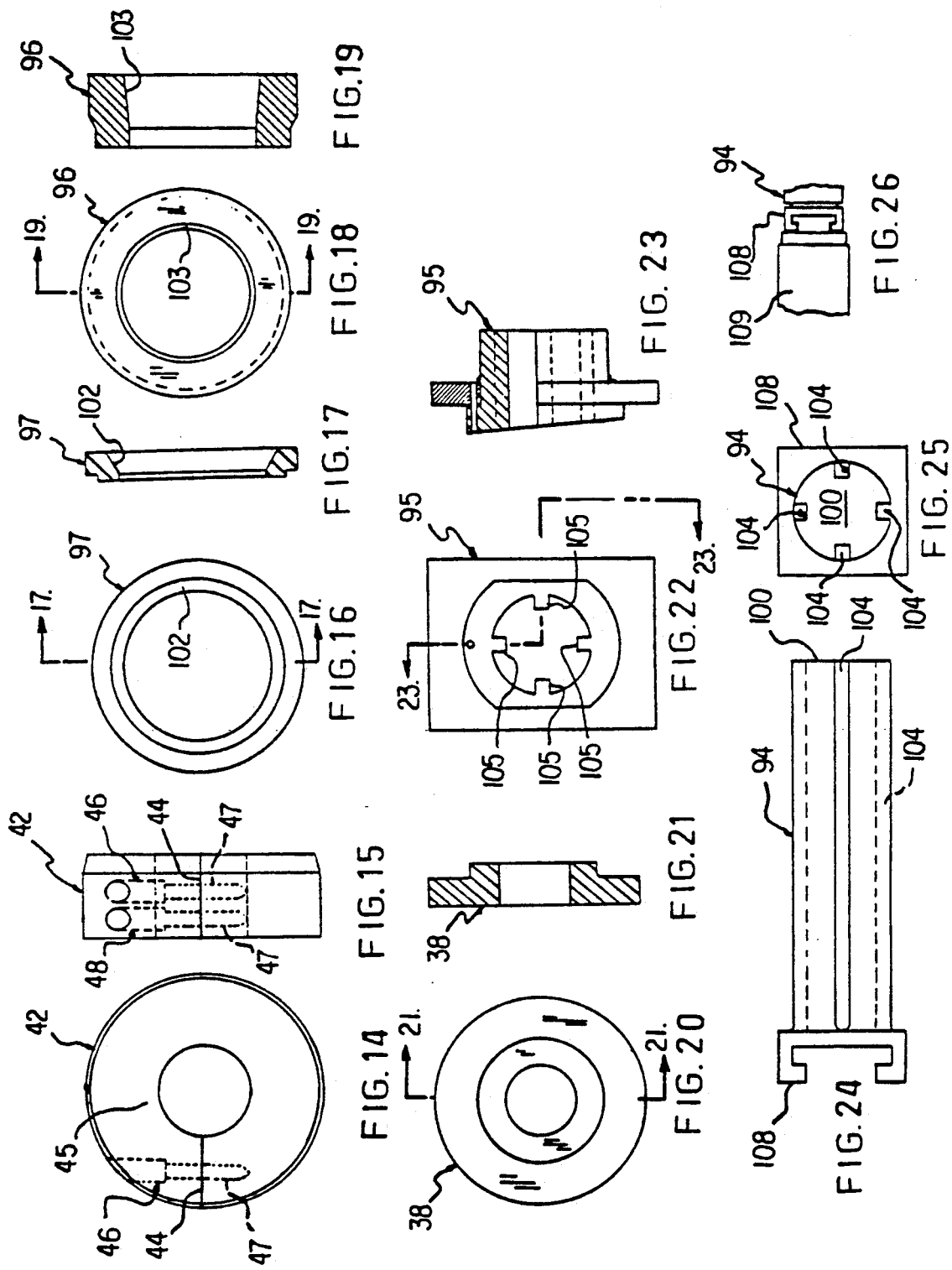

BILLET PRE-PIERCER APPARATUS AND METHOD

BACKGROUND OF THE INVENTION

The present invention relates to apparatus for pre-piercing preheated billets which are to be extruded at a later time, and a method for pre-piercing the preheated billets.

Known pre-piercing devices operate as follows. First, a billet, made of metal, is heated to a temperature suitable to permit piercing of the billet. The billet, now preheated, is then placed in a container and a mandrel bar is inserted through the billet, causing the billet to deform within the container so as to accommodate the mandrel bar. The pre-pierced billet so formed is then removed and extruded in a subsequent step.

Existing pre-piercing technology provides piercing along only a portion of the length of the billet. In the known technology, a slug is left inside the billet and the hole formed by the mandrel bar does not extend throughout the entire length of the billet. The slug is then removed in a subsequent operation.

A problem exists with this existing pre-piercing technology, in that the shearing out of the slug from the inside of the billet can cause structural damage to the billet, or can produce internal stresses, that can adversely affect the quality of the billet when subsequently subjected to a final extrusion operation.

There are several disadvantages associated with the known pre-piercer devices. First, during operation, these pre-piercer devices must include delays between consecutive strokes of the mandrel bar to permit loading of another billet to be pre-pierced and to permit unloading of a billet which has already been pre-pierced along a portion of its length by the mandrel bar. Therefore, the throughput of billets in the known pre-piercing devices is limited by the time required for the steps of loading and unloading the billets.

Another problem in the art is the provision of good concentricity of the opening formed in the pre-pierced billet. Gaps existing between the billet and the container prior to pre-piercing are detrimental to the concentricity of the opening formed in the pre-pierced billet by the mandrel bar.

It is another problem in the known pre-piercer devices to permit changeover to another billet size without reconfiguring the pre-piercer device and without requiring a lengthy shutdown for replacement of parts.

It is still another problem in the art to reduce deflection of the mandrel bar as the mandrel bar pushes its piercing tip into the billet. Deflection of the mandrel bar cause eccentricity not only in the shape but also in the mechanical properties of the resulting pre-pierced billet. Deflection of the mandrel bar during pre-piercing can be caused by variations in the mechanical properties of the billet to which is to be pre-pierced. For example, uneven heating of the billet prior to the pre-piercing operation can generate hard or soft spots in the billet. Since the piercing tip of the mandrel bar will tend to follow the path of least resistance, restrained only by its own mechanical rigidity and by any support or guide that is provided, the mandrel bar will therefore tend to deflect during the pre-piercing operation.

Additionally, it is a problem in the prior art to remove a slug from a billet during the pre-piercing process.

It is still another problem in the art to selectively control the slug thickness. In view of various practical considerations involving the desired qualities of the resulting pre-pierced billet, the slug has a preferred thickness which varies depending upon the billet diameter, billet length, and composition of the billet.

SUMMARY OF THE INVENTION

It is an object of the present invention to provide a pre-piercer apparatus and method for pre-piercing preheated billets which are to be subjected to a subsequent extrusion process, in which the pre-pierced billets so formed have an improved concentricity and in which a single pre-piercer apparatus can produce pre-pierced billets at a relatively high rate.

These and other objects are accomplished by a pre-piercer apparatus having:

a generally cylindrical container, with two open ends for receiving and supporting a generally cylindrical billet;

a mandrel bar mounted adjacent one open end of the cylinder for axial movement along the axis of the cylinder for penetrating the billet;

bolster means, disposed adjacent the other open end of the cylinder for engaging the billet during penetration of the billet by the mandrel bar, with the bolster means including a bolster pin which is axially movable along the axis of the container, and which has an end which contacts the billet prior to and during penetration of the billet by the mandrel bar such that the billet deforms about the end of the bolster pin; and a movable support carried by the mandrel bar toward the billet during advancement of the mandrel bar prior to pre-piercing the billet, with the movable support being configured to enter the generally cylindrical container to engage a portion of the container so as to provide additional structural rigidity of the mandrel bar to resist deflection of the mandrel bar during penetration of the billet.

According to another feature of the present invention, the billet is sized by a die as it is being loaded into a container, to provide a close fit between the billet and the interior of the container, so as to produce good concentricity of the resulting pre-pierced billet. This is accomplished by provision of a sizing die disposed at the rear end of the container through which the billet is introduced, the rear end of the container being that end which is distal from the mandrel bar prior to the pre-piercing operation.

In another aspect of the present invention, the pre-pierced billet formed from a preheated billet for extrusion in a subsequent step as discussed in the foregoing, has a relatively "clean" surface on its rear end, the rear end of the billet being that which is distal from the mandrel bar immediately prior to the pre-piercing operation. This is accomplished by loading of the preheated billet through the sizing die into the rear of the container, providing a bolster pin on the opposite side of the billet from the mandrel bar for engagement with the billet to form the slug, and by withdrawing the bolster pin to permit continued movement of the mandrel bar once a selected slug thickness is reached inside the billet, so that continued movement of the mandrel bar causes ejection of the slug through the rear of the billet. This generates the relatively "clean" surface on the rear of the billet with a minimum of deformation of the billet.

Also according to the present invention, a cyclical process is provided in a pre-piercer apparatus for the prepiercing of preheated billets which are to be subsequently extruded, as discussed in the foregoing, in which billet containers are cyclically moved from a loading position to a pre-piercing position and from the pre-piercing position to a discharging position, so that the loading and discharging operations take place at locations which are displaced from the axis of the mandrel bar. This arrangement permits billet loading and discharging to take place without interfering with operation of the mandrel bar during billet pre-piercing.

In a still further feature of the present invention, the pre-piercer apparatus for pre-piercing preheated billets as discussed in the foregoing, removes a slug from the billet during pre-piercing, the slug being removed by movement together in the same direction of the mandrel bar and the bolster pin with the slug disposed between the ends of the mandrel bar and the bolster pin.

The pre-piercer apparatus according to a further feature of the present invention has a bolster pin with a plurality of grooves formed longitudinally therein, wherein the bolster pin is initially positioned a selected distance into the rear of the container holding a billet to be pre-pierced so that advancement of the mandrel bar toward the bolster pin causes deformation of the billet about the outer portion of the end of the bolster pin and into the grooves formed in the bolster pin, and in which a stripper plate is provided through which the bolster pin is withdrawn, the stripper plate having projections extending into the grooves in the bolster pin so as to separate the slug from the bolster pin when the bolster pin is withdrawn through the stripper plate.

The invention will be described in greater detail below with reference to an embodiment that is illustrated in the drawings.

BRIEF DESCRIPTION OF THE DRAWINGS

FIG. 14 is a front elevational view of a movable mandrel support according to the invention.

FIG. 15 is a side elevational view of the movable mandrel support of FIG. 14.

FIG. 16 is a front elevational view of a billet loader sizing die according to the invention.

FIG. 17 is a longitudinal sectional view of the billet loader sizing die taken along line 17—17 of FIG. 16.

FIG. 18 is a front elevational view of a bolster pin guide die according to the invention.

FIG. 19 is a longitudinal sectional view of the bolster pin guide die taken along line 19—19 of FIG. 18.

FIG. 20 is a front elevational view of a mandrel fixed support for supporting the mandrel bar during the pre-piercing operation.

FIG. 21 is a longitudinal sectional view of the mandrel fixed support taken along line 21—21 of FIG. 20.

FIG. 22 is a front elevational view of a stripper plate according to the invention.

FIG. 23 is a side elevational view of the stripper plate, shown partially in section, taken along line 23—23 of FIG. 22.

FIG. 24 is a side elevational view of a bolster pin according to the invention.

FIG. 25 is an end elevational view of the bolster pin of FIG. 24.

FIG. 26 is a side elevational view of a coupling for connecting the bolster pin to a ram.

DETAILED DESCRIPTION OF THE PREFERRED EMBODIMENT

Figure 1:
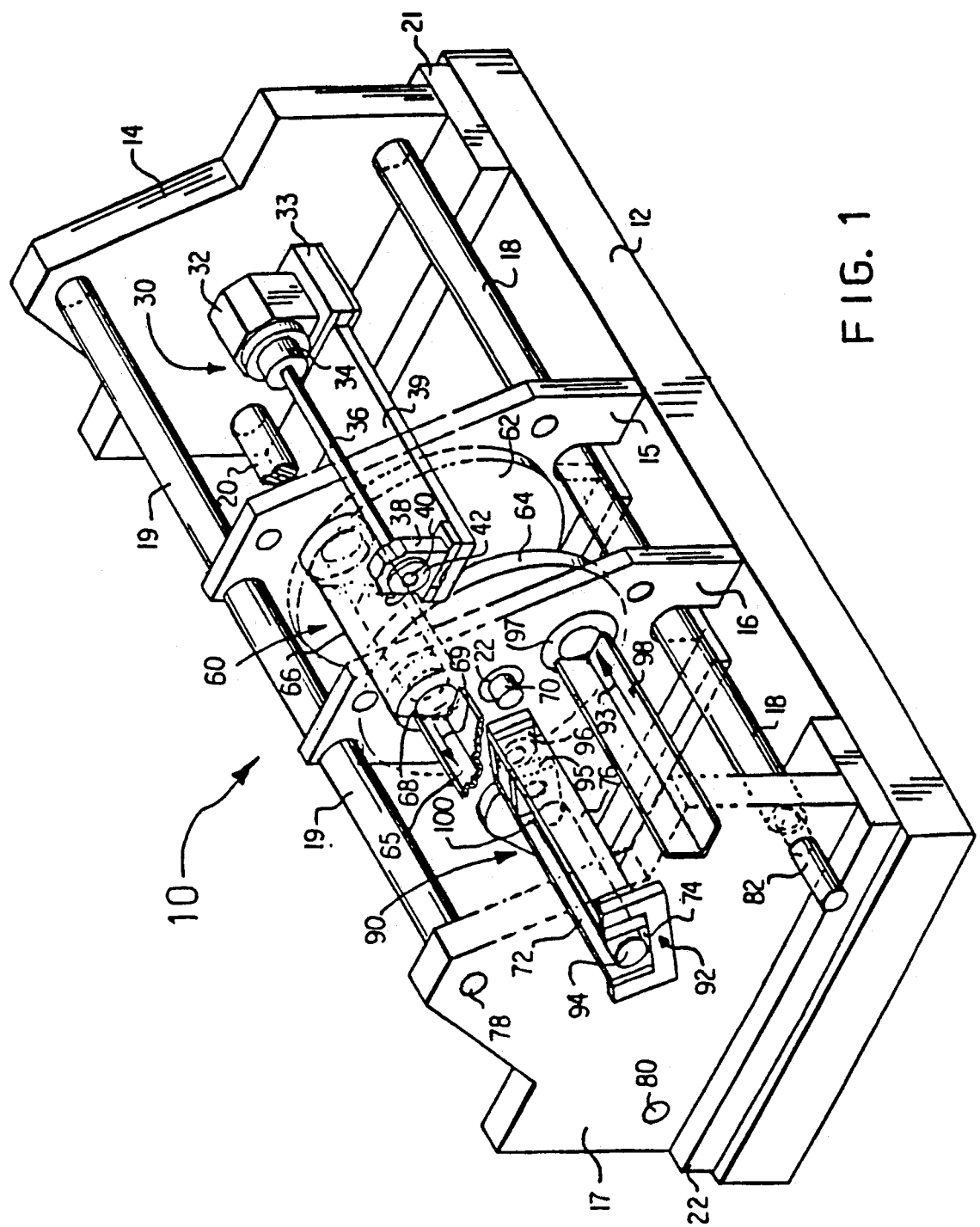
FIG. 1 is a perspective view of a pre-piercer apparatus according to the invention.

As seen in FIG. 1, a pre-piercer apparatus 10 includes a mandrel section 30, a turret section 60, and a bolster section 90. A base 12 supports first and second end walls 14 and 17, respectively, as well as first and second turret support walls 15 and 16, respectively. The first and second end walls 14 and 17 are spaced apart by support rods 18, 19 and 20 respectively having threaded extensions 82, 78, and 80 which project through the second end wall 17 and which are respectively secured by threaded nuts (not shown). The first and second end walls 14 and 17 have respective bases 21 and 22 which are in turn connected to the base 12.

The mandrel section 30 includes a mandrel end support 32 which is supported by a slidable mandrel base 33. The slidable mandrel base 33 in turn is supported for movement on, and constrained to follow, a mandrel slide 39. The mandrel end support 32 has a mandrel guide 34 which supports a proximal end of a mandrel bar 36. The mandrel bar 36 has a piercer tip 40 and is slidably supported at its distal end by a mandrel fixed support 38 which is fixedly connected to the mandrel slide 39. The mandrel bar 36 extends through an aperture or bore in the mandrel fixed support 38. Adjacent the piercer tip 40 is a movable mandrel support 42.

The turret section 60 includes first and second turret end plates 62 and 64, a turret shaft 70 about which the first and second turret end plates 62 and 64 rotate, a plurality of containers 66 (only one of which is shown in FIG. 1) supported between the first and second turret end plates 62 and 64, and a plurality of billet loader sizing dies 97 which are connected to the first turret end plate 62 adjacent each respective opening to the containers 66. The first and second end plates 62 and 64, as well as the first and second end walls 15 and 16, are shown partially in phantom outline to show nearby portions of the mandrel section 30. The turret section 60 is supported by a turret shaft 70 and a bearing 22 which surrounds the turret shaft 70.

The bolster section 90 includes a loading tray 98, a bolster tray 92, a discharge tray 65, and a bolster pin 94 which is disposed along the same axis as the mandrel bar 36. The bolster pin 94 has a tip 100, and is surrounded on three sides by the bolster tray 92 which has side walls 72 and 76 as well as a bottom wall 74.

The loading tray 98 is used to support individual billets 110 (not shown in FIG. 1) which are supplied to a container 66 positioned adjacent the loading tray 98, the billets 110 being supplied through an opening in the second turret support wall 16 in a direction indicated by arrow 93. In the preferred embodiment, the horizontal and vertical location of the loading tray 98 is adjustable to accommodate billets 110 having different diameters. The adjustment mechanism for adjusting the height of the loading tray 98, which is not shown in the Figs., preferably includes mechanical or hydraulic jacks. The horizontal position of the loading tray 98 can similarly be adjusted mechanically or hydraulically, for example.

The bolster tray 92 supports a stripper plate 95 and a bolster pin guide die 96. In the preferred embodiment, the vertical and horizontal location of the bolster tray 92 is adjustable to permit accommodation of different sizes of stripper plates 95 and different sizes of bolster pin guide dies 96 in order to accommodate different bolster pin diameters. The adjustment mechanism for vertically adjusting the location of the bolster tray 92, which mechanism is not shown in the Figs., preferably includes mechanical or hydraulic jacks.

The discharge tray 65 is disposed adjacent an opening 68 in the second turret support wall 16 to receive a pre-pierced billet 110. In the preferred embodiment, the horizontal and vertical location of the discharge tray 65 is adjustable in order to accommodate billets 110 having different diameters. The adjustment mechanism for adjusting the height of the discharge tray 65, which mechanism is not shown in the Figs., preferably includes mechanical or hydraulic jacks. The horizontal and vertical position of the discharge tray 65 can be adjusted mechanically or hydraulically, for example.

In operation, the turret section 60 rotates the container 66 from a loading position adjacent the loading tray 98 to a pre-piercing position between the mandrel bar 36 and the bolster pin 94. After the billet 110 is pre-pierced, the container 66 is rotated as part of the turret section 60 to a discharge position adjacent the discharge tray 65. The billet 110 in the container 66 is discharged from the container 66 through the opening 68 in the second turret support wall in a discharge direction which is indicated by arrow 69.

Figure 2:
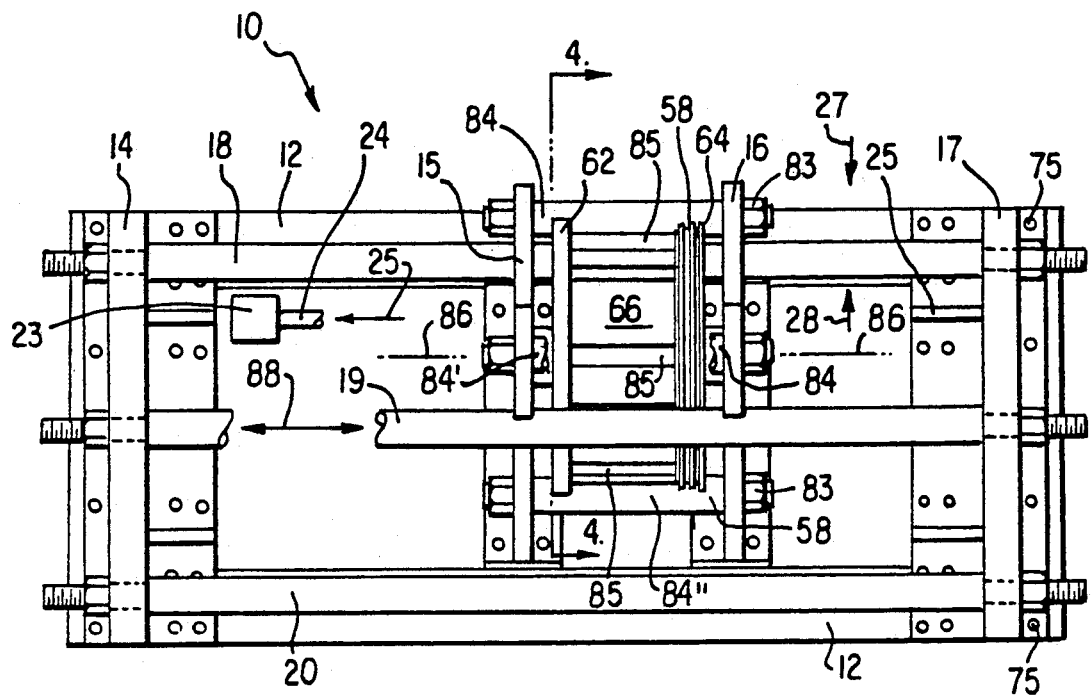
FIG. 2 is a top elevational view of the pre-piercer apparatus of FIG. 1 with the orientation being reversed from left to right as compared with FIG. 1, showing a turret assembly and supporting walls, some elements being omitted for the sake of clarity.

FIG. 2 schematically shows the pre-piercer apparatus 10 in a top elevational view. The support rods 18, 19, and 20 stabilize and space the first and second end walls 14 and 17, and pass through openings in the first and second turret support walls 15 and 16. Some structures shown in FIG. 1 have been omitted from both FIGS. 2 and 3 for the sake of clarity.

A turret shaft 70 passes between and is supported by the first and second turret support walls 15 and 16. The turret shaft 70 supports the first and second turret end plates 62 and 64. The first and second turret end plates 62 and 64 are rotatable about a central turret axis 86, and carry a plurality of containers 66 of a first size alternating with a plurality of containers 61 of a second size, each of the containers 61 and 66 being aligned such that their respective central axes are parallel to the turret axis 86. The axes of each of the containers 61 are disposed at a predetermined radial distance from the axis 86, and the axes of each of the containers 66 are disposed at another predetermined radial distance from the axis 86. The containers 61 and 66 are alternatingly disposed, as shown in FIGS. 3 and 4, in a circumferential direction about the axis 86, with the containers 61 being smaller than the containers 66 in order to snugly accommodate a smaller size of billet.

Figure 3:
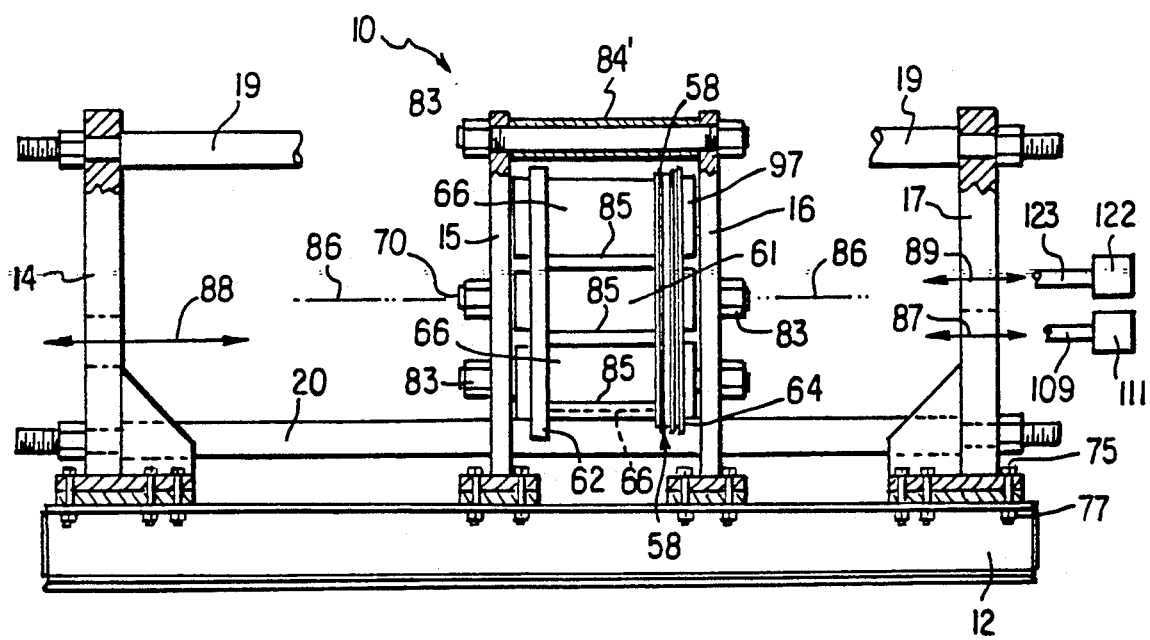
FIG. 3 is a front elevational view of the pre-piercer apparatus shown in FIG. 2.
Figure 4:
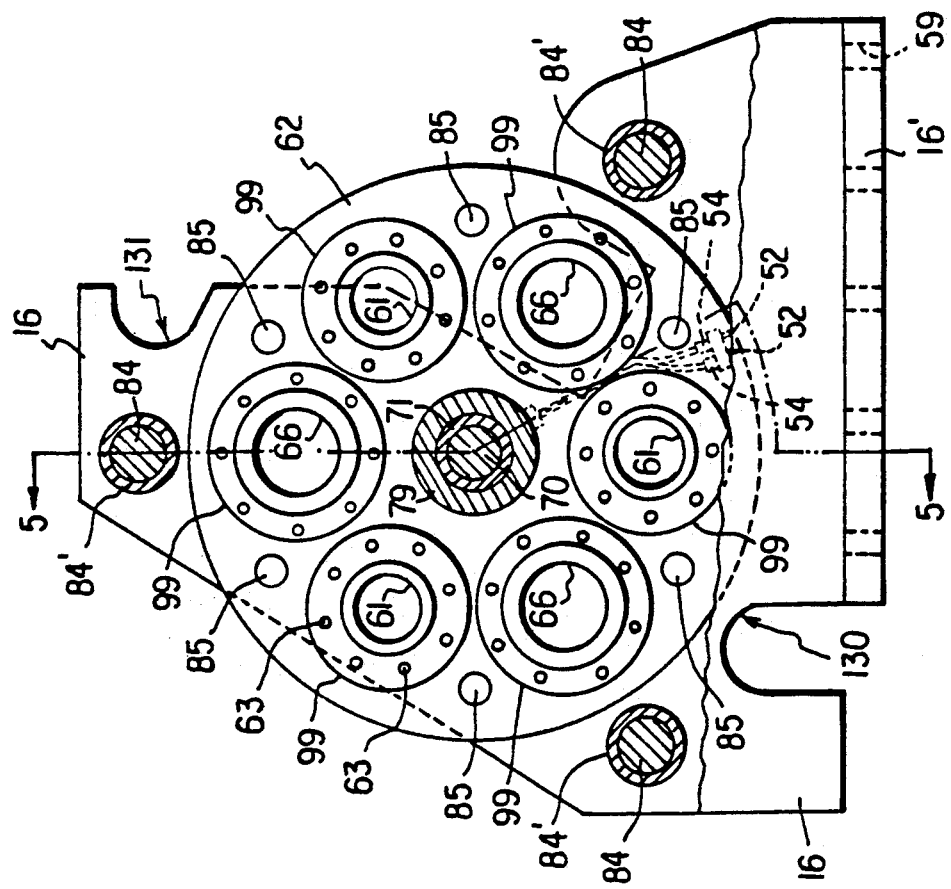
FIG. 4 is a side sectional view of the pre-piercer apparatus taken along line 4—4 of FIG. 2.

Three spacing rods 84, 84', and 84", shown in FIGS. 2 and 3, connect the first and second turret support walls 15 and 16. The spacer rod 84' is broken away in FIG. 2, and is shown in section in FIG. 3. As shown in FIG. 3, the spacer rod 84' extends longitudinally and has an outer sleeve which is enlarged relative to its ends. The enlarged portion of the outer sleeve of the spacer rod 84' abuts, at either end, the respective inner surfaces of the first and second turret support walls 15 and 16. The spacer rod 84' has two threaded ends extending from the enlarged portion, each threaded end being secured by respective threaded nuts against the respective outside surfaces of the first and second end walls 14 and 17. The spacer rods 84 and 84" are similarly shaped and secured. This arrangement stabilizes the first and second turret support walls 15 and 16 against relative movement.

A billet ejection cylinder driver 23 is schematically shown in FIG. 2 which axially drives a billet ejection cylinder 24 which is also schematically shown. The billet ejection cylinder 24 is movable along an axis which is indicated by the double-headed arrow 25 in FIG. 2 and which is referred to hereafter as billet discharge axis 25. The billet ejection cylinder 24 is arranged such that it can enter an opening in the first turret support wall 15 and enter one of the containers 66 disposed along the billet discharge axis 25. The billet ejection cylinder 24 thereby ejects the billet 110 from its container 66 through the opening 68 in the second turret support wall 16. The ejected billet 110 is then removed from the bolster section 90 of the apparatus 10 along a billet "out" direction which is indicated by the arrow 28 in FIG. 2. Billets 110 which are to be pre-pierced are transported to the pre-piercer apparatus 10 along a billet "in" direction which is indicated by arrow 27 in FIG. 2.

The mandrel bar 30 (omitted in FIGS. 2 and 3) during operation travels back and forth in the direction indicated by the double-headed arrow 88 in FIGS. 2 and 3. The support rod 19 is shown broken away in FIG. 2 for the sake of clarity and to permit illustration of the location of the double-headed arrow 88 which is hereafter referred to as piercer cylinder axis 88. The bolster pin 94 (not shown in FIGS. 2 and 3) during operation travels back and forth along a direction which is indicated by double-headed arrow 87 as shown in FIG. 3, and is known hereafter as bolster rod axis 87. A bolster pin driver 111 is schematically shown in FIG. 3 for driving a ram 109 which is connected to the bolster pin 94, to drive the ram 109 along the bolster rod axis. The bolster pin 94 or the ram 109 (depending upon the relative lengths of each) passes through an opening (unnumbered) in the second end wall 17. Alternatively, the bolster pin driver 111 and the ram 109 can be disposed on the other side of the second end wall 17.

Loading of the billets 110 is performed by a load cylinder driver 122 which drives a load cylinder 123 as shown schematically in FIG. 3. The load cylinder 123 is movable back and forth along a direction indicated by a double-headed arrow 89 in FIG. 3, hereafter known as the load cylinder axis. The load cylinder 123 can be located to the right of the second end wall 17 in FIG. 3 such that it passes through an opening (unnumbered) in the second end wall 17. However, it is within the scope of the invention to dispose the load cylinder driver 122 and its load cylinder 123 on the opposite side of the second end wall 17, in which case no opening need be formed in the second end wall 17 for passage of the load cylinder 123 therethrough.

A plurality of bolts 75, as shown in FIGS. 2 and 3, are used to secure the first and second turret support walls 15 and 16, as well as the first and second end walls 14 and 17, to the base 12. The bolts 75 may be secured in place by nuts 77 screwed onto their respective threaded ends.

Figure 5:
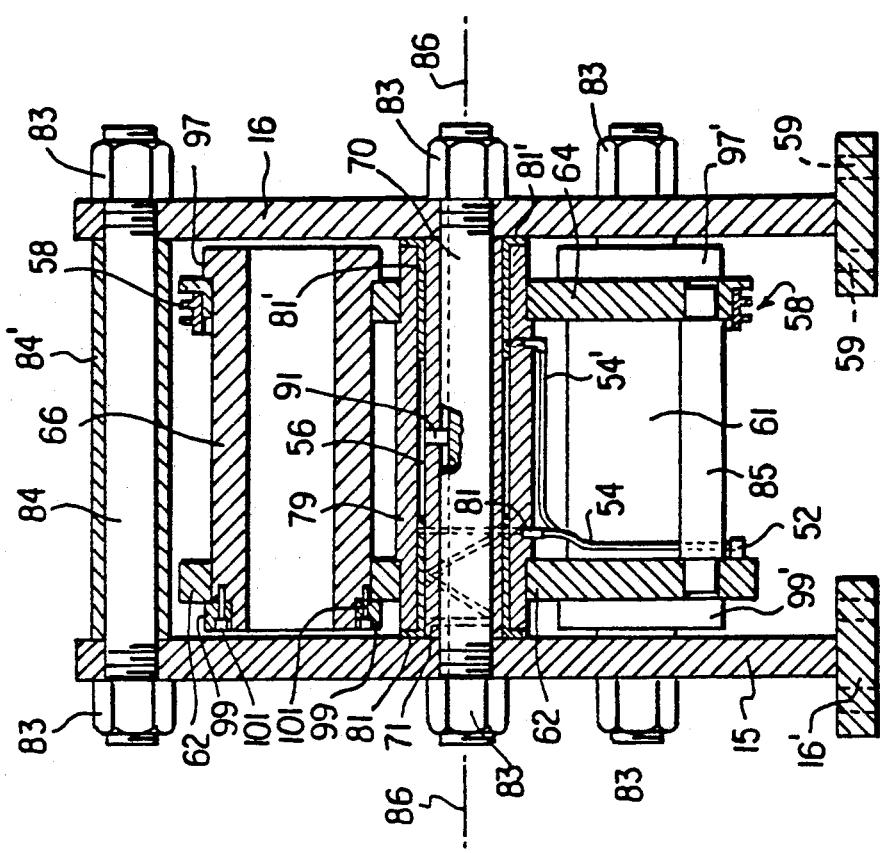
FIG. 5 is a longitudinal sectional view of the pre-piercer apparatus taken along line 5—5 of FIG. 4.

FIG. 4 shows an elevational view of the first turret end plate 62 with the spacer rods 84 and their sleeves 84' shown in section. A plurality of indexing rods 85 are disposed between the first and second turret end plates 62 and 64 and are circumferentially disposed about the axis 86, as shown in FIGS. 4 and 5. The second turret support wall 16 is visible behind the first turret end plate 62 in FIG. 4.

As shown in FIG. 4, the turret shaft 70 is received within a sleeve 71. The sleeve 71 is in turn received within a sleeve 79. As shown in FIG. 5, the sleeve 79 is coaxially spaced about the turret shaft sleeve 71 by a pair of spacing members 81, 81', thereby forming an annular passage 56 between the sleeve 79 and the turret shaft sleeve 71. Oil or another type of lubricant material can be injected into the annular passage 56 via supply lines 54 and 54'. The supply lines 54 have inlet ends 52, as shown in FIGS. 4 and 5. The turret shaft sleeve 71 is keyed to the turret shaft 70 by at least one key 91 as shown in FIG. 5.

The first turret end plate 62 has a plurality of end members 99 which are respectively secured to the first turret end plate 62 by a plurality of bolts 63, as schematically shown in FIG. 4. The other end of each respective one of the containers 61 and 66 is supported within the second turret end plate 64, as shown in FIG. 5. Additionally, the indexing rods 85 are equi-angularly spaced about the turret axis 86 and are disposed at a predetermined radial distance from the turret axis 86. The second turret support wall 16 has a base portion 16' which has a plurality of bores therein for receiving the bolts 75 (shown in FIGS. 2 and 3).

FIG. 5 is a sectional view taken along line 5—5 of FIG. 4 showing in section one of the containers 66 and showing in perspective one of the containers 61. A spacer rod 84 is shown in section together with its sleeve 84'. Threading is schematically shown on the ends of the spacer rod 84, and nuts 83 are disposed on the ends of the turret shaft 70, the nuts 83 being illustrated in perspective view. One of the spacer rods 85 is seen in perspective view, with its ends being shown schematically which are received respectively within the first and second turret end plates 62 and 64. The periphery of the second turret end plate 64 has at least one drive train track 58 for receiving a drive chain 114 (shown in FIG. 6) which is used for causing rotation of the rotatable portions of the turret section 60 about the turret axis 86.

Each container 66 is secured within the first and second turret end plates 62 and 64 as follows. Each container 66 has an enlarged end 97 which prevents passage of the container 66 through the second turret end plate 64. The other end of the container 66 extends through an opening in the first turret end plate 62 and is secured against axial displacement by an end member 99 having a larger outer diameter than the end of the container 66 projecting beyond the first turret end plate 62. The end member 99 can be secured to the container 66 by a plurality of screws 101, as shown in FIG. 5. Similarly, the container 61 is secured against axial movement by an end member 99' and, at its other end, by an enlarged portion 97'.

Figure 7:
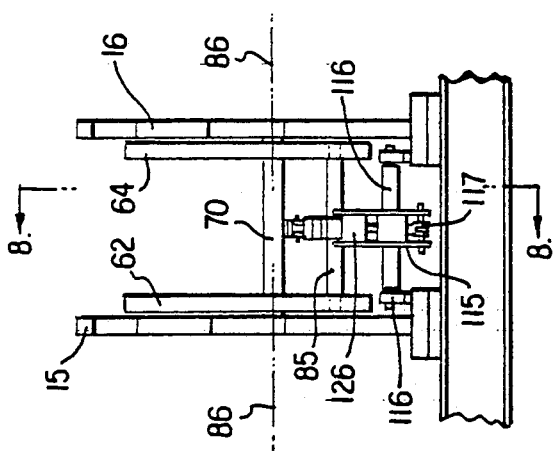
FIG. 7 is a front elevational view of a turret indexing mechanism connected with the turret and turret support structure of FIG. 6.
Figure 8:
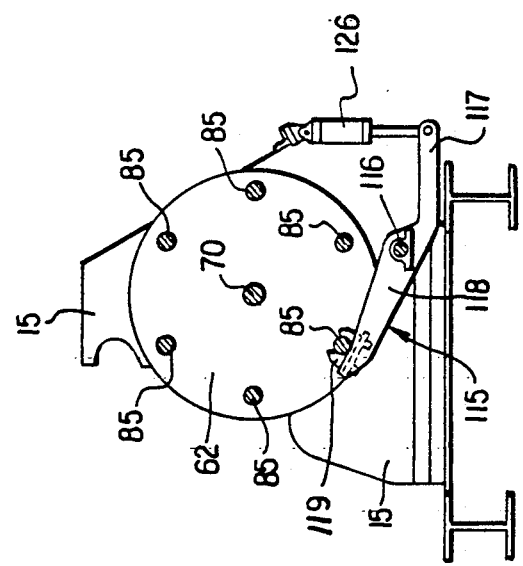
FIG. 8 is a side sectional view taken along line 8—8 of FIG. 7.

The use of the indexing rods 85 and the manner of indexing the rotatable portion of the turret section 60 are schematically shown in FIGS. 7 and 8. A turret indexing mechanism 115 includes bearings 116 which pivotably support an arm portion 118 having a rod-receiving portion 119 for receiving one of the indexing rods 85 in an indexed position. The turret indexing mechanism 115 includes an actuator 126 which can be, for example, a pneumatic or hydraulic actuator which is connected at one end to a portion of the first turret support wall 15 and at its other end to an arm portion 117. The actuator 126 can be either automatically or manually operated so that it can cause selective engagement and disengagement of the rod-receiving portion 119 with an adjacent one of the indexing rods 85.

Figure 6:
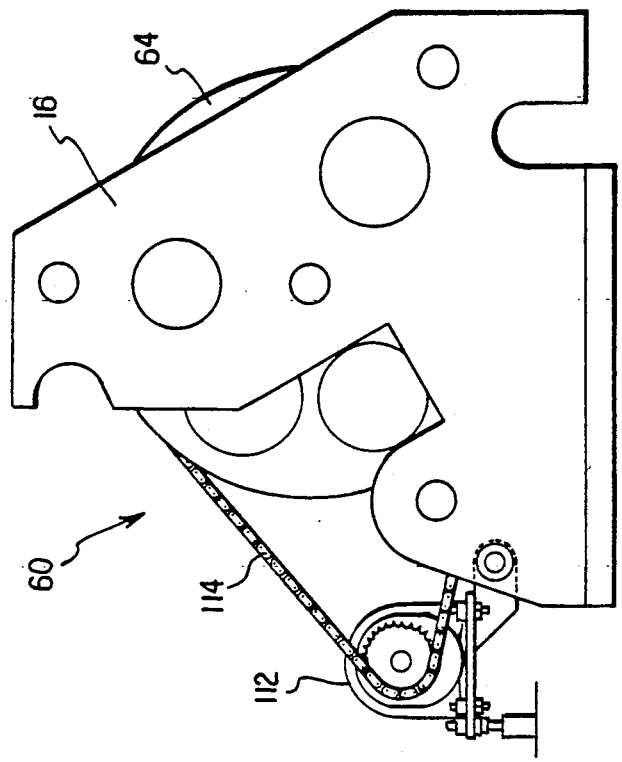
FIG. 6 is a side view of a turret support wall and turret drive in which portions of the pre-piercer apparatus have been omitted for the sake of clarity.

FIG. 6 is a schematic, end elevational view of the second turret support wall 16 and the second turret end plate 64 which is behind it. The second turret end plate 64 is driven by a chain 114 which contacts the periphery of the second turret end plate 64. A turret drive motor 112 drives the chain 114, thereby driving the rotation of the turret assembly 60.

Figure 9:
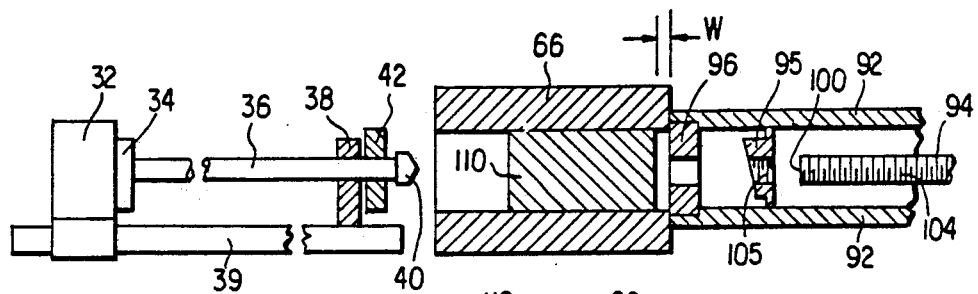
FIGS. 9-13 schematically show an operating cycle of the pre-piercer apparatus according to the invention, showing in section a mandrel bar, a container, a billet, and a bolster pin during one complete pre-piercing cycle of operation.

FIGS. 9 through 13 schematically show the steps in pre-piercing of a billet 110. In FIG. 9, the mandrel bar 36 supports the movable mandrel support 42 in its initial position near the mandrel fixed support 38. At the same time, the bolster pin 94 is in a retracted position away from the billet 110 and is withdrawn from the bolster pin guide die 96 and the stripper plate 95. As shown in FIGS. 9-13, the mandrel end support 32 may be slidable relative to the mandrel slide 39.

To reach the initial position shown in FIG. 9, the load cylinder 123 will have first loaded the billet 110 through the billet loader sizing die 97 into the container 66 (i.e., from the right of the container 66 in FIG. 9) such that the rightmost end of the billet 110 is spaced a predetermined distance W from the rightmost end of the container 66. The bolster pin guide die 96 is disposed adjacent the rightmost end of the container 66. The bolster pin guide die 96 and the stripper plate 95 are supported in position by the bolster tray 92 which is shown schematically in FIGS. 9-13.

Due to pressure exerted by the load cylinder 123 during loading of the billet 110 into the container 66, the rightmost end of the billet 110 becomes somewhat deformed. Due to the direction from which the billet 110 is loaded into the container 66, the deformed end of the billet 110 is disposed opposite the side of the billet 110 which is first entered by the piercer tip 40, this arrangement having advantages as explained further in the following.

Figure 10:
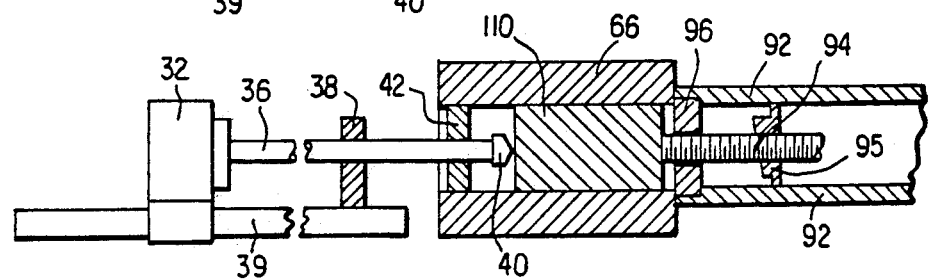

The billet 110 is preferably heated prior to insertion into the container 66 so that, in FIGS. 9-13, the billet 110 remains sufficiently heated to facilitate the pre-piercing operation. FIG. 10 shows entry of the mandrel bar 36 into the container 66 just prior to penetration of the billet 110. The mandrel bar 36 carries with it the piercer tip 40 and the movable mandrel support 42. During this step, the movable mandrel support 42 is urged into the container 66 by frictional force existing between the movable mandrel support 42 and the mandrel bar 36. Either at the same time, or in sequence with the initial movement of the mandrel bar 36, the bolster pin driver 111 causes the ram 109 to push the bolster pin 94 toward the billet 110 until the bolster tip 100 is in contact with, or closely adjacent to, the rightmost end of the billet 110. The bolster pin 94 has a plurality of grooves or keyways 104 (shown in FIGS. 24 and 25, and indicated schematically in dotted outline in FIGS. 9-13). The stripper plate 95 has a plurality of teeth 105 (shown in FIG. 22) which occupy corresponding ones of the grooves 104 when the bolster pin 94 passes through the stripper plate 95.

Figure 11:
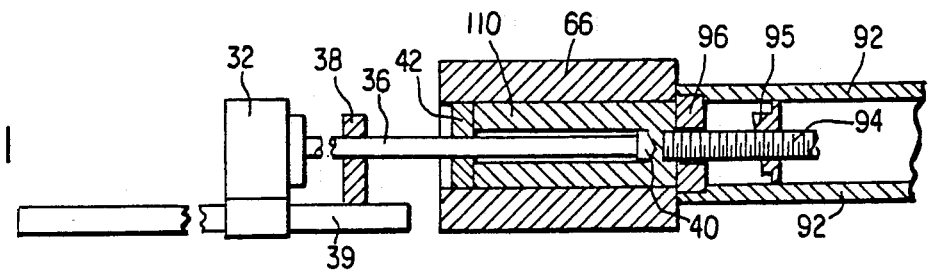
Figure 12:
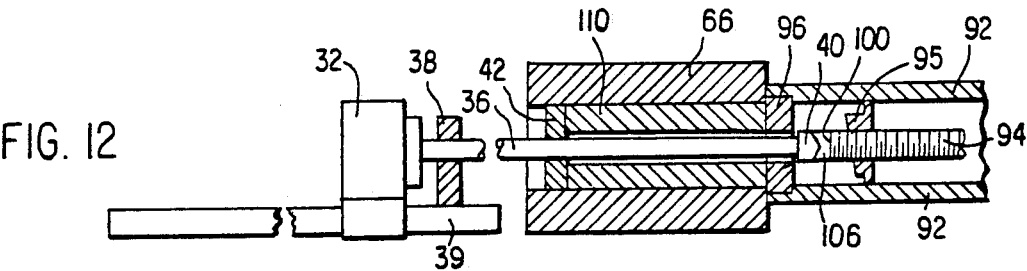

In arriving at the position shown in FIG. 11, the mandrel bar 36 is caused to penetrate the billet 110 and extend into it to a location close to the tip 100 of the bolster pin 94. During penetration, the billet 110 deforms leftwardly and rightwardly within the container 66 to accommodate the mandrel bar 36. The leftmost end of the billet 110 contacts the movable mandrel plate 42, while the rightmost end of the billet 110 deforms about the end 100 of the mandrel bar 94 and against the bolster pin guide die 96. The relative positions of the piercer tip 40 and the end 100 of the bolster pin 94 which are shown in FIG. 11 define a slug thickness. From this predetermined position, the mandrel bar 36 and the bolster pin 94 proceed from their respective positions shown in FIG. 11 to their respective positions shown in FIG. 12. During this time the bolster pin 36 retracts at substantially the same rate at which the mandrel bar 36 advances, so that together the mandrel bar 36 and the bolster pin 94 carry a slug 106 between them which is removed from the billet 110 as shown in FIG. 12. The presence of the movable support 42 within the container 66 at a location near the piercer tip 40 provides support and guidance to the mandrel bar 36 to greatly limit its deflection as it penetrates the billet 110. This deflection is principally limited by the clearance between the outer periphery of the movable mandrel support 42 and the interior surface of the container 66. With a relatively snug fit between the inner surface of the container 66 and the outer periphery of the movable mandrel support 42, deflection of the mandrel bar 36 is greatly reduced, so that the prepiercing operation results in a highly concentric pierced hole in the billet 110. The presence of the movable mandrel support 42 in the container 66 during pre-piercing, by providing additional support for the mandrel bar 36, minimizes a variety of problems associated with pre-piercing of the billet 110. Variations in the mechanical properties of the billet 110 are generally caused by changes or variations in temperature or other process variables. For example, the condition of the leftmost end face of the billet 110 ordinarily can affect the deflection of the mandrel bar 36 due to asymmetrical forces occurring against the piercer tip 40, however, the presence of the movable mandrel support 42 in the container 66 prevents significant deflection of the mandrel bar 36, thereby preventing formation of an eccentrically pierced hole in the billet 110. Additionally, variations in the mechanical properties of any given pierced billet 110 can cause deflecting forces to occur on the mandrel bar 36 during the pre-piercing operation. In particular, uneven heating of the billet 110 can produce relatively hard or relatively soft spots within the billet 110, and the piercer tip 40 will tend to follow the path of least resistance, restrained only by its own structural rigidity and by any support structure or guide member that may be provided. It therefore follows that the close proximity of the movable mandrel support 42 to the billet 110 is a significant improvement over other pre-piercing methods.

Figure 13:
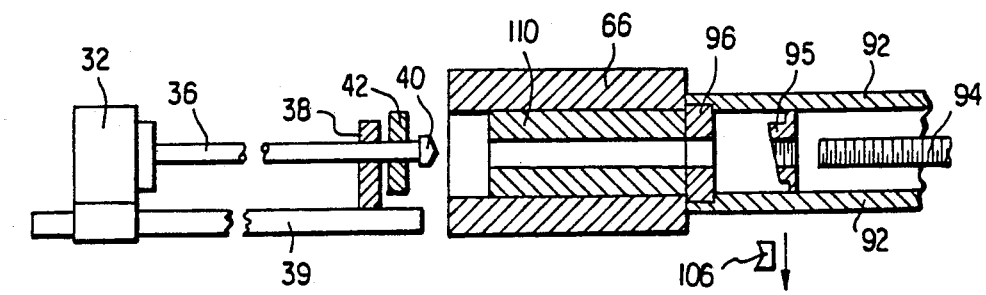

The fixed support 38 is fastened to prevent relative movement with respect to the mandrel slide 39. The fixed support 38 provides support for the mandrel bar 36 at a position just outside of the container 66. The fixed support 38 effectively reduces the unsupported column length of the mandrel bar 36, resulting in a relatively rigid structure which reduces deflection of the mandrel bar 36, improves the alignment of the mandrel bar 36, and improves the concentricity of the prepierced billet 110. Additionally, during retraction of the mandrel bar 36, the presence of the fixed support 38 stops the movable mandrel support 42 as shown in FIG. 13, i.e., during retraction of the mandrel bar 36 relative sliding occurs between the mandrel bar 36 and the movable mandrel support 42. This repositioning of the movable mandrel support 42 against the fixed support 38 is necessary for the next cycle of pre-piercing operation in which the sequence shown in FIGS. 9-13 is repeated, since the movable support mandrel 42 must be positioned near the piercer tip 40 in order to be carried to the container 66. The relative movement of the movable support number 42 relative to the mandrel bar 36 scrapes and cleans the mandrel bar 36 so as to displace any formed materials on the outside of the mandrel bar 36. The passage of the mandrel bar through the fixed support 38 also cleans and scrapes the mandrel bar 36. This cleaning action assists in maintenance of the overall alignment between the mandrel bar 36 and the billet 110 which is to be pre-pierced.

The mandrel bar 36 continues to advance until the piercer tip 40 projects beyond the rightmost end of the billet 110. As shown in FIG. 12, the piercer tip 40 can be advanced until it extends just beyond the rightmost side of the bolster pin guide die 96, although it need not be advanced this far for completion of the pre-piercing operation itself. In the position shown in FIG. 12, the billet 110 is completely pre-pierced, and the slug 106 is retained between the piercer tip 40 and the end 100 of the bolster pin 94. From this position, the mandrel bar 36 is withdrawn through the bolster guide die 96 until the position shown in FIG. 13 is reached. At the same time, the bolster pin 94 is withdrawn through the stripper plate 95, carrying the slug 106 on the tip 100 until the slug 106 contacts the stripper plate 95. As the bolster pin 94 is withdrawn through the stripper plate 95, the slug 106 is separated or stripped from the bolster pin 94 and falls downwardly as indicated by the arrow (unnumbered) adjacent the slug 106 in FIG. 13. The mandrel 36, the support 32 and the bolster pin 94 are now in position, as shown in FIG. 13, to begin a new pre-piercing cycle. Upon withdrawal of the mandrel bar 36, the container 66 is rotated about the turret axis 86 to move the pre-pierced billet 110 to the discharge location adjacent the discharge tray 65, simultaneously bringing another container 66, containing another billet 110, into position for pre-piercing adjacent the mandrel bar 36. The pre-pierced billet 110 is then removed from the container 66 at the discharge location, which is off the piercing axis (i.e., off the piercer cylinder axis 88), so that unloading of the pre-pierced billet 110 can be performed at the same time that another pre-piercing operation is being conducted.

Since the billet 110 is pushed through the sizing die 97 which is sized to the inside diameter of the container 66, the billet 110 has an outside diameter which is closely dimensioned to the inside diameter of the container 66. The close sizing of the billet 110 to the inside diameter of the container 66 results in improved concentricity of the pierced hole formed in the billet 110 by reducing the play that may exist between the movable mandrel support 42 and the container 66 when the movable mandrel support 42 is positioned inside the container 66. When a different size of container is used, for example a smaller container such as the container 61 shown in FIGS. 4 and 5, a differently dimensioned sizing die 97 is used, so as to form an outside billet diameter which conforms closely to the inside diameter of the container 61.

The bolster pin 94 can be selectively positioned so that the bolster pin tip 100 can extend at various distances into the container 66. This variable position of the bolster pin 94 permits control over the position of the sheared surface generated by the final separation of the slug 106 from the inside wall of the pierced hole in the billet 110. In some extrudable materials, the shearing of the slug 106 from the inside wall of the billet 110 can produce a deformation of the structure of the billet 110 that can adversely affect the quality of any extrusion formed from that portion of the billet 110. Therefore, the adjustable position of the bolster 100 within the billet 110 permits precise control of the quality of any final extrusion product which may be made from the billet 110, due to control over the positioning of the sheared surface discussed in the foregoing.

The bolster pin guide die 96 has a relatively small radial clearance around the outside diameter of the bolster pin 94 and around the piercer tip 40 of the mandrel bar 36. This relatively small radial clearance between the piercer tip 40 and the bolster pin guide die 96 provides a relatively clean shear surface at the exit location of the slug 106 from the billet 110. This contributes to the generation of a relatively clean surface on the "back" surface of the billet 110, i.e. the rightmost side surface of the billet 110, with a consequently reduced degree of deformation of the billet 110.

The thickness of the scrap slug 106 can be controlled by either of two methods, as follows.

In a first method, the position of the piercer 40 is known as it advances into the billet 110. When the piercer tip 40 reaches a predetermined position relative to the bolster pin 100, pressure in a bolster control cylinder (not shown) is released, thereby permitting the bolster pin 94 to be pushed out of the billet 110 by the advancement of the mandrel bar 36. This type of control can be based upon detection of the actual movement of the mandrel bar 36 or of the mandrel end support 32, for example. This control can be based upon an electrical control system, a pneumatic control system, or hydraulic control system, among others.

In a second control method, an adjustable relief valve (not shown) could be provided on a bolster pin cylinder (not shown). The bolster pin cylinder is a hydraulic cylinder used to drive the bolster pin 96. The adjustable relief valve can be set to relieve pressure on the bolster pin cylinder, so as to predetermine the position at which the bolster pin 94 will retract, dependent upon the forces acting upon it within the billet 110, due to advancement of the mandrel bar 36 into the billet 110. This second control method is based upon the fact that, in a normal piercing operation, the axial forces acting upon the bolster pin tip 100 vary as the piercer tip 40 advances through the billet 110, also taking into consideration that some of the energy required during pre-piercing is dissipated by friction. For example, some of the energy required during the pre-piercing operation is dissipated into friction between the outer surface of the billet 110 and the inside wall of the container 66.

The rightmost end of the billet 110 is commonly referred to as the butt end, which is ordinarily discarded or scrapped. The turret section 60, the bolster section 90, and the mandrel section 30 are arranged such that the butt end of the billet 110 contains the sheared surface created by removal of the slug 106. The butt end of the billet 110 also sustains most of the damage due to the effects of the passage of the billet 110 through the sizing die 97 and due to the deformation of the rightmost end of the billet 110 about the bolster pin tip 100 during the pre-piercing operation. This arrangement advantageously results in improved quality of extrusions produced from the pierced billet 110, since the pre-piercing operation principally affects the butt end of the billet 110 which is ordinarily scrapped rather than the remainder of the billet 110 which is used for producing extrusion products.

The present invention advantageously uses hot pre-piercing for the piercing of billets 110, i.e. the billets 110 are heated to a suitable temperature for pre-piercing, thereby reducing the force necessary to produce a pierced hole of a given size. This permits processing of longer billets and also permits formation of smaller pierced holes. The diameter to length ratio of the piercing mandrel 36, is another limiting element in the pre-piercing process. After pre-piercing, the billet 110 is reheated to extrusion temperature, and this reheating step reduces further internal stresses and structural damage at the butt end of the billet 110, especially in the vicinity of the shear area where the slug 106 has been removed, thereby minimizing possible problems associated with the flow of the metal of the billet 110 during a subsequent extrusion process.

The turret section 60, due to its structure, confers the following benefits during operation. Pre-piercing of the billet 110 disposed at the piercing location can take place simultaneously with the loading of another billet 110 via the loading tray 98 and with discharge of a pre-pierced billet 110 via the discharge tray 65. When the piercing step is completed, the turret section 60 is rotated to bring the loaded billet 110 into the piercing location, the emptied one of the containers 66 into the loading location, and the pierced billet 110 into the discharge location. The loading, piercing, and discharge steps can then be repeated. This results in increased throughput of pierced billets 110 by the pre-piercer apparatus 10. These advantages accrue from the following features. In the turret section, the billet 110 which is to be loaded is disposed for loading off the piercer cylinder axis 88. Similarly, unloading of the pierced billet 110 is performed off the piercing cylinder axis 88. This permits a relatively high production rate of pre-pierced billets 110. Due to the use of indexing of the turret section 60 described in the above, any one of the containers 61 or 66 can be selectively accurately positioned at the piercing location, thereby improving the concentricity of the resultant pierced hole in the billet 110. Additionally, due to the provision of the differently-sized containers 61 and 66, it is possible to process billets of two different sizes without change in the turret section 60, although the height of the loading tray 98 and of the discharge tray 65 must be adjusted, as discussed in the above. Furthermore, the bolster mechanism permitting removal of the slug 106 from the billet 110 is relatively simple, allows for reliable operation of the entire pre-piercer apparatus 10, and allows retention of alignment capabilities (i.e., alignment of the bolster pin 94 relative to the position of the billet 110 at the piercing location).

As shown in FIGS. 14 and 15, the movable mandrel support 42 is composed of a generally solid cylindrical body having a thin slot 44 oriented along a radial direction. The slot 44 is preferably 3/32 inches in width, to permit adjustment of the clamping force exerted by the movable mandrel support 42 on the mandrel bar 36. Two countersunk openings 46 and 48, having threaded portions 47 as shown in dotted outline in FIGS. 14 and 15, are oriented generally transversely to the plane of the slit 44. Headed fasteners such as bolts (not shown) can be respectively threaded into the threaded portions 47 of each of the countersunk bores 46 and 48 to adjustably clamp the slit 44. The inside surface 45 of the movable mandrel support 42 is sized to closely receive the mandrel bar 36, so that clamping forces exerted by the bolts in the countersunk bores 46 and 48 can provide sufficient frictional force between the mandrel bar 36 and the movable mandrel support 42 to urge the movable support 42 into the container 66 during entry of the mandrel bar 36 into the container 61 or 66 disposed at the pre-piercing location. Frictional force is required to perform this step, since the movable mandrel support 42 is closely sized to the interior of the container 66 to minimize radial play, and therefore it is necessary to overcome frictional forces arising between the movable mandrel support 42 and the inner surface of the container 61 or 66 into which it is inserted.

As shown in FIGS. 16 and 17, the billet loader sizing die 97 is a ring-like body having a conically-tapering surface 102 on the billet insertion side of the sizing die 97.

As shown in FIGS. 18 and 19, the bolster guide die 96 has a conically-tapering surface 103 on the insertion side of the bolster pin guide die 96 to facilitate entry of the bolster pin tip 100.

As shown in FIGS. 20 and 21, the fixed support 38 is a generally ring-shaped body having a substantially cylindrical bore therethrough for receiving the mandrel bar 36. No conically-shaped interior surfaces are necessary in the fixed support 38 since the mandrel bar 36 is not removed from the fixed support during ordinary operations. As shown in FIGS. 22 and 23 and discussed in the above, the stripper plate 95 includes a generally cylindrical bore having a plurality of teeth 105 projecting radially into the bore.

FIGS. 24 and 25 show the bolster pin 94. The bolster pin 94 has a plurality of grooves or keyways 104 which receive the teeth 105 of the stripper plate 95 during passage of the bolster pin 94 through the stripper plate 95. The bolster pin 94 has a bolster pin connector 108 at its end which is distal from the bolster pin 100. The bolster pin connector 108 is adapted to be coupled to a ram 109 used for moving the bolster pin 94. The bolster pin connector 108 permits use of different sizes of bolster pins 94 and also facilitates quick replacement of the bolster pin 94 for maintenance. A coupling similar to that shown in FIG. 26 is also preferably used for coupling the mandrel bar 36 to a mandrel ram (not shown) to facilitate replacement of the mandrel bar 36 for maintenance and for changing the size of the mandrel bar 36 and/or the movable support 32.

It will be understood that the above description of the present invention is susceptible to various modifications, changes and adaptations, and the same are intended to be comprehended within the meaning and range of equivalents of the appended claims.

What is claimed is:

1. An apparatus for pre-piercing billets, comprising:
    a generally cylindrical container having first and second open ends for receiving and supporting a generally cylindrical billet;
    a mandrel bar mounted adjacent said first end of said cylinder for axial movement along the axis of said cylinder for penetrating the billet;
    bolster means disposed adjacent said second end of said cylinder for engaging the billet during penetration of the billet by said mandrel bar, said bolster means including a bolster pin which is axially movable along said axis of said container, said bolster pin having an end which contacts the billet during penetration of the billet by said mandrel bar such that the billet deforms about said end of said bolster pin; and
    a movable support carried by said mandrel bar toward the billet during advancement of said mandrel bar prior to pre-piercing the billet, said movable support being configured to enter said generally cylindrical container to engage a portion of said container so as to provide additional structure rigidity to said mandrel bar to resist deflection of said mandrel bar during penetration of the billet.

2. An apparatus for pre-piercing billets as claimed in claim 1, wherein said movable support is a generally annular body having a central opening therein snugly receiving said mandrel bar and is axially movable along said mandrel bar.

3. An apparatus for pre-piercing billets as claimed in claim 1, wherein said movable support is snugly received within a cylindrical interior portion of said container, and is movable by said mandrel bar during advancement of said mandrel bar.

4. An apparatus for pre-piercing billets as claimed in claim 1, further comprising a sizing die centered on said axis of said cylinder and disposed adjacent one of said two open ends of said container during loading of a billet into said container, such that the exterior surface of the billet conforms relatively closely to the interior of said container.

5. An apparatus for pre-piercing billets as claimed in claim 1 further comprising:
    a fixed support for said mandrel bar disposed adjacent said first open end of said container; and wherein said movable support is mounted on said mandrel bar between said fixed support and a piercing tip of said mandrel bar which has a greater diameter than the following portion of said mandrel bar.

6. An apparatus for pre-piercing billets as claimed in claim 5 wherein said bolster pin has the same diameter as said piercing tip.

7. An apparatus for pre-piercing billets as claimed in claim 1, further comprising a bolster pin guide die having an axial bore through which said bolster pin passes for guiding said bolster pin during movement thereof and for closing said second of said two open ends of said container.

8. A method for pre-piercing billets using the apparatus of claim 7, comprising the steps of:
    advancing said mandrel bar toward a billet disposed in said container while carrying said movable support into said container and advancing said bolster pin into said container to contact an adjacent end of said billet;
    advancing said mandrel bar to penetrate said billet, while maintaining said bolster pin in a fixed position, until a predetermined location is reached relative to said bolster pin to define a slug therebetween;

continuing to advance said mandrel bar while simultaneously withdrawing said bolster pin such that said slug is removed from said billet between said mandrel bar and said bolster pin, and passes through said bore in said pin guide die;

withdrawing said mandrel bar from the billet and removing said movable support from said container by operation of said mandrel bar; and removing said slug from said bolster pin.

9. An apparatus for pre-piercing billets, comprising:

rotatable turret means for supporting a plurality of containers for rotation about a turret axis; each respective one of said plurality of containers having two open ends and a central axis, each one of said plurality of containers being adapted to receive a billet and being disposed such that its central axis is oriented parallel to and at a predetermined distance from said turret axis; each of said plurality of containers being sequentially rotatable by said rotatable turret means to a loading position, a pre-piercing position, and a discharge position;

a mandrel bar disposed at said pre-piercing position mounted for axial movement into an open end of an adjacently disposed one of said containers along the axis of the adjacently disposed cylinder for penetrating the billet;

bolster means at said pre-piercing position for engaging the billet during penetration of the billet by said mandrel bar, said bolster means including a bolster pin which is axially movable along the axis of said adjacent one of said containers, said bolster pin having an end which contacts the billet in said adjacent one of said containers during penetration of the billet by said mandrel bar such that the billet deforms about said end of said bolster pin; said bolster pin being disposed on an opposite side of said container from said mandrel bar, said bolster pin being movable from said adjacent one of said containers substantially simultaneously with the advance of said mandrel bar such that a slug is formed between the end of said mandrel bar and said end of said bolster pin during advancement of said mandrel bar; said slug being removable from the billet by withdrawal of said bolster pin from said container as said end of said mandrel bar advances completely through the billet.

10. An apparatus for pre-piercing billets as claimed in claim 7, wherein said bolster means further comprises a bolster pin guide die which is disposed at an open end of the adjacent said container for guiding and stabilizing said bolster pin during movement of said bolster pin into and out of the adjacent said container, and for closing said container.

11. An apparatus for pre-piercing billets as claimed in claim 10, further comprising a stripper die through said bolster pin passes, for separating said slug from said bolster pin during retraction of said bolster pin through said stripper die.

12. An apparatus for pre-piercing billets as claimed in claim 11, wherein said bolster pin has a plurality of grooves therein to retain said slug during withdrawal of said bolster pin from said container, and said stripper die has a plurality of projections which respectively extend into said plurality of grooves in said bolster pin.

13. An apparatus for pre-piercing billets as claimed in claim 9, wherein said rotatable turret further comprises another plurality of containers for supporting billets, each of said plurality of containers having a central axis disposed at selected distance from said turret axis, said another plurality of containers having a size different than that of said plurality of containers.

14. An apparatus for pre-piercing billets as claimed in claim 7, further comprising a sizing die disposed at said loading position such that it is adjacent an open end of the adjacent one of said plurality of containers when at said loading position, and a loading means for loading the billet through said sizing die into said open end of said adjacent container.

15. An apparatus for pre-piercing billets as claimed in claim 9, further comprising a billet ejection means at said discharge position for discharging said billet from said container.

16. An apparatus for pre-piercing billets as claimed in claim 15, wherein said bolster pin, said billet ejection means, and said loading means act upon a first end of the billet, and wherein said mandrel bar first enters the billet at a second end opposite said first end; whereby said second end of the billet remains relatively undeformed during loading and discharging of the billet.

17. An apparatus for pre-piercing billets as claimed in claim 9 further comprising a movable mandrel support mounted on said mandrel bar adjacent its piercing tip for axial movement along said mandrel bar, said movable mandrel support frictionally engaging said mandrel bar such that said movable support is carried toward said cylinder during advancement of said mandrel bar toward the billet prior to pre-piercing, said movable support having an outer periphery corresponding to the inner surface of said container, whereby said movable support, upon entering a said container, engages said inner surface to provide additional structural rigidity to said mandrel bar to resist deflection of said mandrel bar during penetration of the billet.

18. A method for pre-piercing billets in the apparatus of claim 17, comprising the steps of:

advancing said mandrel bar toward said billet while carrying said movable support into said container and advancing said bolster pin to said billet;

advancing said mandrel bar to penetrate said billet until a predetermined location is reached relative to said bolster pin to define a slug therebetween, and continuing to advance said mandrel bar while simultaneously withdrawing said bolster pin such that said slug is removed from said billet between said mandrel bar and said bolster pin.

19. A method for pre-piercing billets as claimed in claim 18, further comprising the step of:

withdrawing said bolster pin carrying said slug through a stripper plate until said slug is removed from said bolster pin.

20. A method for pre-piercing billets as claimed in claim 18, further comprising, after the removal of said slug from the billet, the steps of withdrawing said mandrel bar from the billet and removing said movable support from said container by operation of said mandrel bar.

21. A method for pre-piercing billets as claimed in claim 20, further comprising, after the step of withdrawing said mandrel bar, the steps of rotating said container from a position adjacent said pre-piercing position to said discharge position, and discharging the pre-pierced billet from said container.

22. A method for pre-piercing billets as claimed in claim 18, during any of the steps of advancement of said mandrel bar, further comprising the step of simultaneously loading another billet through said sizing die into an adjacent one of said containers at said loading position to size said billet closely to the interior of the respectively adjacent one of said plurality of containers.

* * * * *

UNITED STATES PATENT AND TRADEMARK OFFICE
CERTIFICATE OF CORRECTION

PATENT NO. : 5,007,274

DATED : April 16th, 1991

INVENTOR(S) : Charles L. Stewart

It is certified that error appears in the above-identified patent and that said Letters Patent is hereby corrected as shown below:

```
Column 15, line 52:
Claim 10, line 2, please change "7" to --9--; and
Column 16, line  9:
Claim 14, line 2, change "7" to --9--.
```

Signed and Sealed this

Second Day of November, 1993

*Attest:*

BRUCE LEHMAN

*Attesting Officer*     *Commissioner of Patents and Trademarks*